US010026158B2

(12) United States Patent
Aoki et al.

(10) Patent No.: US 10,026,158 B2
(45) Date of Patent: Jul. 17, 2018

(54) IMAGING DEVICE

(71) Applicant: HITACHI AUTOMOTIVE SYSTEMS, LTD., Hitachinaka-shi, Ibaraki (JP)

(72) Inventors: Toshiyuki Aoki, Tokyo (JP); Takeshi Shima, Tokyo (JP); Tatsuhiko Monji, Ibaraki (JP); Hiroshi Kuroda, Ibaraki (JP); Keiichi Betsui, Tokyo (JP); Seiji Murata, Tokyo (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 11 days.

(21) Appl. No.: 15/500,741

(22) PCT Filed: Aug. 17, 2015

(86) PCT No.: PCT/JP2015/072986
§ 371 (c)(1),
(2) Date: Jan. 31, 2017

(87) PCT Pub. No.: WO2016/047313
PCT Pub. Date: Mar. 31, 2016

(65) Prior Publication Data
US 2017/0221188 A1 Aug. 3, 2017

(30) Foreign Application Priority Data

Sep. 26, 2014 (JP) .................................. 2014-196929

(51) Int. Cl.
*G06T 5/00* (2006.01)
*G01C 3/06* (2006.01)

(52) U.S. Cl.
CPC ................ *G06T 5/003* (2013.01); *G01C 3/06* (2013.01)

(58) Field of Classification Search
CPC ............ G06T 5/003; G06T 7/593; G01C 3/06
See application file for complete search history.

(56) References Cited

U.S. PATENT DOCUMENTS

2004/0005091 A1  1/2004 Maruya
2004/0056950 A1  3/2004 Takeda
(Continued)

FOREIGN PATENT DOCUMENTS

JP   2001-126065 A   5/2001
JP   2004-21921 A    1/2004
(Continued)

OTHER PUBLICATIONS

Xian et al, "Depth-from-Defocus: Blur Equalization Technique", 2006, Proceedings of SPIE vol. 6382, 63820E, 10 pages.*
(Continued)

*Primary Examiner* — David F Dunphy
(74) *Attorney, Agent, or Firm* — Foley & Lardner LLP

(57) ABSTRACT

The present invention addresses the problem of providing an imaging device that prevents mismatching in image matching for parallax calculation even if the sharpnesses of an end part and center part of a processing area differ. An imaging device 1 according to the present invention is provided with a means for equalizing the sharpnesses of the processing areas of a reference image and a comparison image.

6 Claims, 4 Drawing Sheets

(56) References Cited

U.S. PATENT DOCUMENTS

| | | | |
|---|---|---|---|
| 2006/0239549 A1* | 10/2006 | Kelly | H04N 1/58 382/167 |
| 2008/0316327 A1* | 12/2008 | Steinberg | G06K 9/00248 348/222.1 |
| 2012/0250979 A1* | 10/2012 | Yokoyama | G06T 5/008 382/154 |
| 2013/0002826 A1 | 1/2013 | Ishiyama | |
| 2013/0114887 A1 | 5/2013 | Nanri et al. | |
| 2013/0294683 A1* | 11/2013 | Yamashita | H04N 13/0018 382/154 |
| 2014/0232820 A1* | 8/2014 | Ha | H04N 13/026 348/43 |
| 2015/0156430 A1* | 6/2015 | Ishiga | G06T 5/002 348/241 |
| 2015/0248745 A1* | 9/2015 | Chen | G06T 5/003 382/154 |
| 2016/0042242 A1* | 2/2016 | Segawa | G06T 7/593 382/103 |
| 2018/0041748 A1* | 2/2018 | Lee | G06T 7/593 |

FOREIGN PATENT DOCUMENTS

| | | |
|---|---|---|
| JP | 2004-117078 A | 4/2004 |
| JP | 2013-250907 A | 12/2013 |
| WO | WO 2011/125937 A1 | 10/2011 |
| WO | WO 2012/011227 A1 | 1/2012 |

OTHER PUBLICATIONS

PCT Written Opinion of the International Searching Authority issued in Application No. PCT/JP2015/072986 dated Nov. 24, 2015 (with partial English translation).

PCT International Search Report issued in Application No. PCT/JP2015/072986 dated Nov. 24, 2015.

\* cited by examiner

| $\frac{1}{16}$ | $\frac{2}{16}$ | $\frac{1}{16}$ |
|---|---|---|
| $\frac{2}{16}$ | $\frac{4}{16}$ | $\frac{2}{16}$ |
| $\frac{1}{16}$ | $\frac{2}{16}$ | $\frac{1}{16}$ |

3 × 3

| $\frac{1}{256}$ | $\frac{4}{256}$ | $\frac{6}{256}$ | $\frac{4}{256}$ | $\frac{1}{256}$ |
|---|---|---|---|---|
| $\frac{4}{256}$ | $\frac{16}{256}$ | $\frac{24}{256}$ | $\frac{16}{256}$ | $\frac{4}{256}$ |
| $\frac{6}{256}$ | $\frac{24}{256}$ | $\frac{36}{256}$ | $\frac{24}{256}$ | $\frac{6}{256}$ |
| $\frac{4}{256}$ | $\frac{16}{256}$ | $\frac{24}{256}$ | $\frac{16}{256}$ | $\frac{4}{256}$ |
| $\frac{1}{256}$ | $\frac{4}{256}$ | $\frac{6}{256}$ | $\frac{4}{256}$ | $\frac{1}{256}$ |

5 × 5

| k | k | k |
|---|---|---|
| k | 1+8k | k |
| k | k | k |

IMAGING DEVICE

TECHNICAL FIELD

The present invention relates to an imaging device that calculates a distance to an object by using images photographed by a plurality of cameras.

BACKGROUND ART

PTL 1 discloses a technique for extracting a long-distance region and a short-distance region from right and left acquired images based on a distance image, and calculating a parallax by performing geometric correction of the long-distance region so as to have a high resolution and performing geometric correction of the short-distance region so as to have a low resolution, thereby reducing a processing load without deteriorating a distance accuracy.

CITATION LIST

Patent Literature

PTL 1: JP-A-2001-126065

SUMMARY OF INVENTION

Technical Problem

In the case of a stereo camera using a wide-angle lens, the sharpness (image clarity) at end portions in an upper region and a lower region of each image is much lower than that in a central region. Accordingly, even when the resolution of each image is corrected like in the technique disclosed in PTL 1, the sharpness in the central region of the image is different from the sharpness in the right and left regions with respect to the central region. As a result, mismatching occurs due to the difference in sharpness during image matching in parallax calculation, which may cause an erroneous determination that images are not located at corresponding positions.

An object of the present invention is to provide an imaging device that prevents mismatching due to a difference in sharpness during image matching in parallax calculation.

Solution to Problem

In order to solve the above issue, an imaging device according to the present invention calculates a distance to an object based on images obtained by simultaneously photographing the object by a plurality of cameras, and includes: processing region setting means for setting a processing region on each of the images; sharpness equalization means for equalizing sharpness in the processing region of each of the images, the processing region being set by the processing region setting means; parallax calculation means for calculating a parallax from the processing region of each of the images, the sharpness in the processing region being equalized by the sharpness equalization means; and distance calculation means for calculating a distance to the object based on the parallax calculated by the parallax calculation means.

Advantageous Effects of Invention

According to the present invention, the sharpnesses in object recognition regions of images, which are simultaneously photographed by a plurality of cameras, are equalized to thereby prevent mismatching during image matching in parallax calculation. Note that problems to be solved, configurations, and advantageous effects other than those described above will become apparent from the following embodiments.

DESCRIPTION OF EMBODIMENTS

Figure 1:
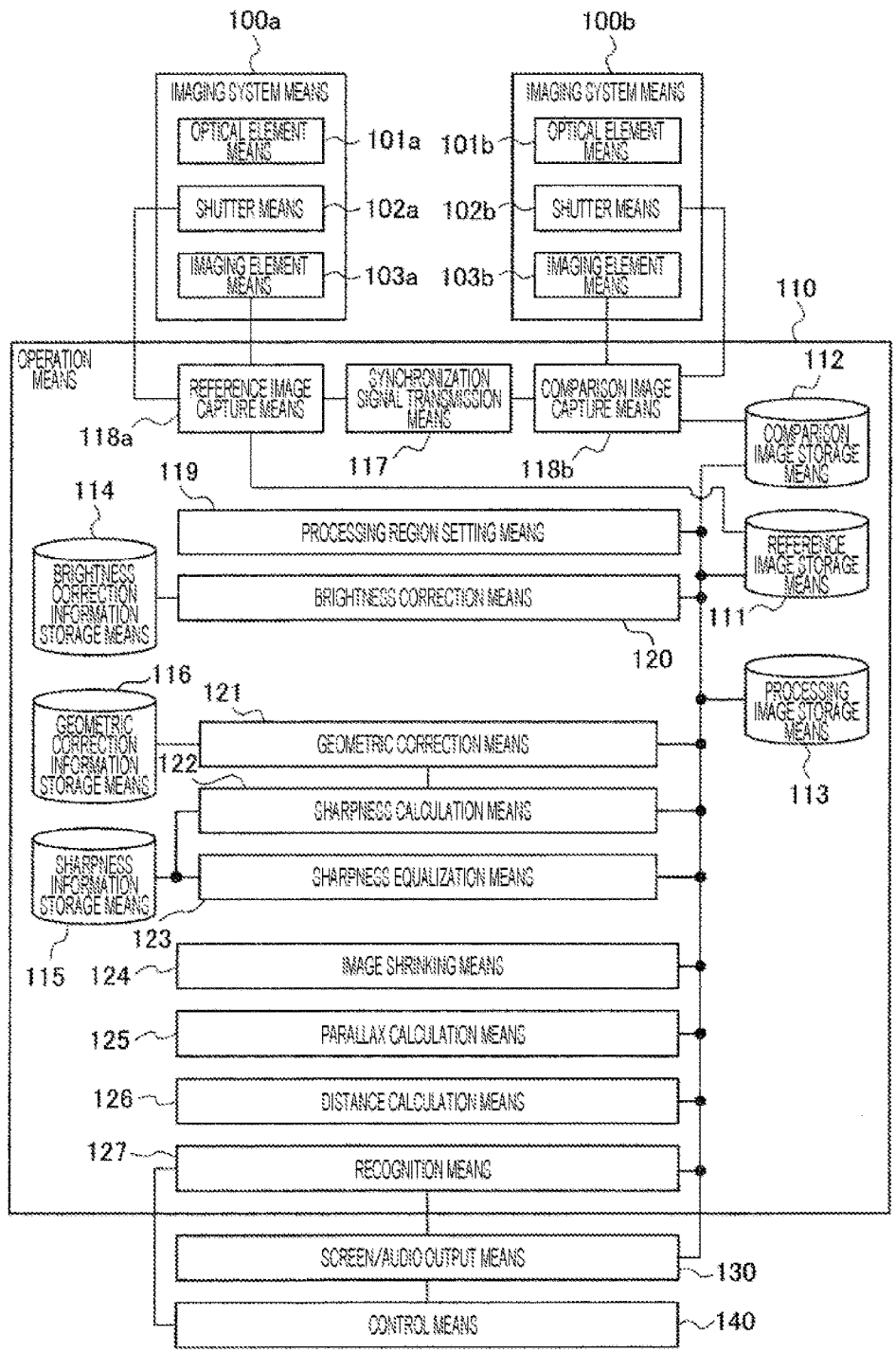
FIG. 1 is a diagram showing a configuration of an embodiment of an imaging device of the present invention.

FIG. 1 is a diagram showing a configuration of an embodiment of an imaging device of the present invention.

An imaging device 1 of this embodiment is, for example, a stereo camera to be mounted in a vehicle, and includes a pair of right and left imaging system means 100a and 100b that capture images of an object in front of the vehicle, operation means 110, screen/audio output means 130, and control means 140.

In the imaging device 1, the imaging system means 100a and 100b simultaneously photograph images of an object in front of the vehicle, and the operation means 110 calculates a parallax using the images and calculates a distance to an object in front of the vehicle based on the parallax. Further, the screen/audio output means 130 displays a warning display on an in-vehicle monitor, or outputs an audio message from a speaker or the like, and the control means 140 performs vehicle control such as break control.

Since the right and left imaging system means 100a and 100b are set at right and left positions which are spaced apart from each other by a distance corresponding to a baseline length, in the right and left images that are obtained by simultaneously photographing an object in front of the vehicle, the position of the object on the right image deviates from that on the left image in the horizontal direction. That is, even when a pair of right and left images is obtained by photographing the same object, the position of the object on the right image deviates from that on the left image in the horizontal direction. As the imaging system means 100a and 100b are shifted from a screen central region including an optical axis to right and left screen side regions, the sharpness is reduced. Accordingly, in a pair of right and left images, the sharpnesses in the right and left imaging regions obtained by photographing the same object are highly likely to differ from each other. If image matching is performed in the state where the sharpnesses in the right and left regions differ from each other, mismatching may occur. This embodiment has been made in view of the above-mentioned problem, and matching is performed after equalizing different sharpnesses in the right and left regions, thereby preventing occurrence of mismatching due to the difference in sharpness.

The detailed configuration of the imaging device 1 according to this embodiment will be described below.

The imaging system means 100a and 100b, such as cameras, include optical element means 101a and 101b, shutter means 102a and 102b, and imaging element means 103a and 103b, respectively. The optical element means 101a and 101b, such as lenses, have a structure for refracting light and forming an image on an imaging element. The shutter means 102a and 102b, such as shutters, are installed at a position where the light having passed through the optical element means 101a and 101b passes, and include a mechanism for opening the shutter so that the light passes only during an exposure time at the time of photographing and closing the shutter so that the light is blocked in the other cases.

The imaging element means 103a and 103b, such as imaging elements, receive the image of light refracted by the optical element means 101a and 101b, and generate an image according to the intensity of the light. A design value of the focal length of the imaging system means 100a and a design value of the focal length of the imaging system means 100b are the same. The direction of the optical axis of the imaging system means 100a is substantially the same as that of the imaging system means 100b.

The operation means 110 is composed of a central processing unit (CPU), a memory, and the like, and includes, as internal functions, synchronization signal transmission means 117, reference image capture means 118a, comparison image capture means 118b, processing region setting means 119, brightness correction means 120, geometric correction means 121, sharpness calculation means 122, sharpness equalization means 123, image shrinking means 124, parallax calculation means 125, distance calculation means 126, and recognition means 127.

The operation means 110 includes reference image storage means 111, which is composed of a memory and a hard disk, comparison image storage means 112, processing image storage means 113, brightness correction information storage means 114, sharpness information storage means 115, and geometric correction information storage means 116.

The reference image storage means 111 stores the image photographed by the imaging system means 100a. In the parallax calculation, a template image is cut out from the image stored in the reference image storage means 111, and thus this image is referred to as a reference image.

The comparison image storage means 112 stores the image photographed by the imaging system means 100b. In the parallax calculation, the image stored in the comparison image storage means 112 is searched using the template image, and thus this image is referred to as a comparison image.

The processing image storage means 113 stores images that are processed by each means of the operation means 110 and generated.

The brightness correction information storage means 114 stores correction coefficients for the brightness of each pixel in the images (the reference image and the comparison image) of the imaging system means 100a and the imaging system means 100b. Each correction coefficient is a value at which the brightnesses of the reference image and the comparison image, which are obtained by photographing a uniform light beam or object, are substantially the same in the entire region of the reference image and the comparison image.

Figure 6:
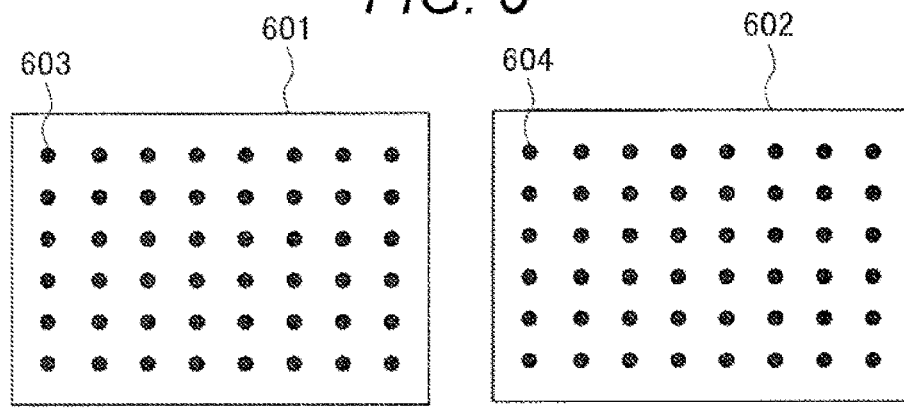
FIG. 6 is a diagram showing an example of a plurality of locations where an index of sharpness is shown in the reference image and the comparison image.

The sharpness information storage means 115 stores the values indicating the index of sharpness in a plurality of predetermined locations 603 and 604 on a reference image 601 and a comparison image 602. FIG. 6 shows the positions of the plurality of predetermined locations 603 and 604. The sharpness information storage means 115 stores the values indicating the index of sharpness of each pixel in the reference image and the comparison image that is calculated by the sharpness calculation means 122. The value of the index of sharpness is a value in an object located at a predetermined distance from the imaging system means 100a and 100b.

The sharpness is one of indices representing the image clarity (sharpness). Note that the resolution represents a degree of fineness of resolution, and the definition of resolution is different from the definition of sharpness. Examples of the index representing the sharpness include a response function (modulation transfer function: MTF), a point spread function (PSF), and a line spread function (LSF).

In this embodiment, the MTF is used as an index representing sharpness. The MTF is a function which indicates a resolution characteristic index of a quantitative scale representing a spatial resolution, and represents a response to each spatial frequency.

The geometric correction information storage means 116 stores the geometric correction amount of each pixel in the images (the reference image and the comparison image) of the imaging system means 100a and the imaging system means 100b. This correction amount is a value for correction to an image when a skew in each of the optical element means 101a and the optical element means 101b is zero; an error in the focal length of each of the imaging system means 100a and the imaging system means 100b is zero; an error in the optical axis position on the image is zero; and a mounting error is zero.

The synchronization signal transmission means 117 generates a synchronization signal and transmits the synchronization signal to each of the reference image capture means 118a and the comparison image capture means 118b. The reference image capture means 118a sends a signal for opening the shutter to the shutter means 102a of the imaging system means 100a in accordance with the synchronization signal from the synchronization signal transmission means 117, and acquires the image generated by the imaging element means 103a. The comparison image capture means 118b sends a signal for opening the shutter to the shutter means 102b of the imaging system means 100b in accordance with the synchronization signal from the synchronization signal transmission means 117, and acquires the image generated by the imaging element means 103b. Accordingly, the images simultaneously photographed by the imaging system means 100a and 100b are captured by the reference image capture means 118a and the comparison image capture means 118b, respectively.

The sharpness calculation means 122 reads, from the sharpness information storage means 115, the MTF values at the plurality of predetermined locations 603 and 604 (FIG. 6) on the reference image 601 and the comparison image 602. The MTF of each pixel is calculated by interpolation or extrapolation based on the MTF values at four close locations for each pixel.

The processing region setting means 119 sets the processing regions in which brightness correction, geometric correction, and parallax calculation are performed on the reference image and the comparison image. In this case, the processing regions are preliminarily set on the reference image and the comparison image.

The brightness correction means 120 reads the correction coefficient for the brightness of each pixel from the brightness correction information storage means 114, and corrects the brightness of the processing regions on the reference image and the comparison image.

The geometric correction means 121 reads the geometric two-dimensional correction amount of each pixel from the geometric correction information storage means 116, and performs geometric correction on the processing regions of the reference image and the comparison image, thereby correcting the shape of the image.

The sharpness equalization means 123 performs processing for equalizing the sharpness in the processing region of the reference image and the sharpness in the processing region (entire region) of the comparison image. In the sharpness equalization, blur filter processing is performed on both processing regions so as to obtain a minimum sharpness value in the processing regions on the reference image and the comparison image.

The image shrinking means 124 calculates the resolution according to the MTF values in the processing regions that are equalized by the sharpness equalization means 123, and performs shrinking processing on the processing regions of the reference image and the comparison image so as to have the resolution. As the sharpness of the image decreases, the detection variability of the parallax increases. Accordingly, as the sharpness of the image decreases, the rate of shrinkage of the image is increased.

The parallax calculation means 125 searches the region on the comparison image corresponding to the region (template image) of a predetermined size extracted from the reference image. A difference between the position of the region on the comparison image that matches the template image and the position of the template image on the reference image, that is, a parallax, is calculated. The parallax is calculated for each pixel, thereby obtaining a parallax image.

The distance calculation means 126 calculates a distance to an object on the image from the imaging device 1 in the optical direction of the imaging system means 100a and the imaging system means 100b based on the parallax calculated by the parallax calculation means 125, the distance (baseline length) between the focal point of the imaging system means 100a and the focal point of the imaging system means 100b, and the focal length and pixel pitches (a distance between pixels of the imaging element means 103a and 103b). The distance is calculated for each pixel, to thereby obtain a distance image.

The recognition means 127 recognizes objects on the reference image and the positions of the objects on the reference image by using the reference image and the distance image, and calculates the three-dimensional relative position and relative speed of each object with respect to the imaging device 1. In this case, in a three-dimensional position coordinate system with respect to the imaging device 1, an x-coordinate is set in the right direction with respect to the imaging system means 100a and the imaging system means 100b; a y-coordinate is set in the upward direction; and a z-coordinate is set in the optical axis direction, assuming that a midpoint between the focal point of the imaging system means 100a and the focal point of the imaging system means 100b is an origin. Further, a time that elapses before occurrence of a collision is calculated based on the relative positions and relative speeds of the imaging device 1 and the object, to thereby determine whether or not the collision occurs within a predetermined time. Information about the relative positions and relative speeds of the imaging device 1 and the object, the collision determination result, and the collision time is sent to each of the screen/audio output means 130 and the control means 140.

The screen/audio output means 130, such as a monitor and a speaker, displays the reference image, the parallax image, or the distance image on the screen, and displays a frame or marker at the position of each object. At this time, the color of the frame or marker for the object that is determined to collide as indicated by the collision determination result from the recognition means 127 is different from that for the object that is determined not to collide. When there is an object that is determined to collide as indicated by the collision determination result from the recognition means 127, warning sound is output.

The control means 140, such as a CPU, generates a control signal based on the relative positions and relative speeds of the imaging device 1 and the object, the collision time, and the collision determination result, and outputs the control signal to the outside of the imaging device.

An operation procedure of an embodiment of the imaging device 1 of the present invention shown in FIG. 1 will be described with reference to the flowchart of FIG. 2.

In step S201, processing for capturing the reference image and the comparison image is carried out. First, the synchronization signal transmission means 117 generates a synchronization signal, and sends the synchronization signal to each of the reference image capture means 118a and the comparison image capture means 118b.

Immediately after receiving the synchronization signal from the synchronization signal transmission means 117, the reference image capture means 118a sends a shutter opening/closing signal and information about the exposure time to the shutter means 102a. Immediately after receiving the shutter opening/closing signal and the information about the exposure time from the reference image capture means 118a, the shutter means 102a opens the shutter mechanism only for the exposure time, and then closes the shutter mechanism. The imaging element means 103a receives the image of light refracted by the optical element means 101a, generates an image according to the intensity of the light, and sends the image to the reference image capture means 118a. The reference image capture means 118a receives the image from the imaging element means 103a, and stores the image in the reference image storage means 111.

Immediately after receiving the synchronization signal from the synchronization signal transmission means 117, the comparison image capture means 118b sends the shutter opening/closing signal and the information about the exposure time to the shutter means 102b. Immediately after receiving the shutter opening/closing signal and the information about the exposure time from the comparison image capture means 118b, the shutter means 102b opens the shutter mechanism only for the exposure time, and then closes the shutter mechanism. The imaging element means 103b receives the image of light refracted by the optical element means 101b, generates an image according to the intensity of the light, and sends the image to the comparison image capture means 118b. The comparison image capture means 118b receives the image from the imaging element means 103b, and stores the image in the comparison image storage means 112.

In step S202, sharpness calculation processing is performed on the reference image and the comparison image. The sharpness calculation means 122 reads the MTF values at the plurality of predetermined locations 603 and 604 (FIG.

Figure 7:
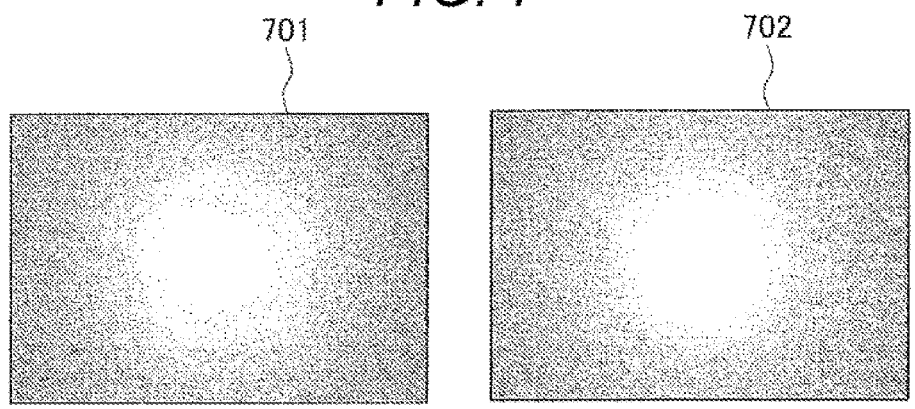
FIG. 7 is a diagram showing an example of an index of sharpness in the reference image and the comparison image.

6) on the reference image 601 and the comparison image 602 from the sharpness information storage means 115. The MTF of each pixel is calculated by interpolation or extrapolation based on the MTF values at four close locations for each pixel. The sharpness calculation means 122 stores the MTF values of each pixel of the reference image and the comparison image in the sharpness information storage means 115. Referring to FIG. 7, the MTF values on the reference image and the comparison image are represented by grayscale. A white area represents a large MTF value and a black area represents a small MTF value.

In step S203, processing region setting processing is carried out. The processing region setting means 119 sets, as the processing region, each predetermined region on the reference image and the comparison image.

In step S204, brightness correction is performed on each of the reference image and the comparison image. The brightness correction means 120 reads, from the brightness correction information storage means 114, the correction coefficients for each pixel in the images of the imaging element means 103a and the imaging element means 103b, and reads the reference image and the comparison image from the reference image storage means 111 and the comparison image storage means 112, respectively. The brightness value of each pixel in the processing region of the reference image is multiplied by the correction coefficient of each pixel, thereby correcting the brightness value in the processing region of the reference image. Similarly, the brightness value of each pixel in the processing region of the comparison image is multiplied by the correction coefficient of each pixel, thereby correcting the brightness value in the processing region of the comparison image. The corrected processing regions of the reference image and the comparison image are stored in the reference image storage means 111 and the comparison image storage means 112, respectively.

Figures 3, 4, 5:
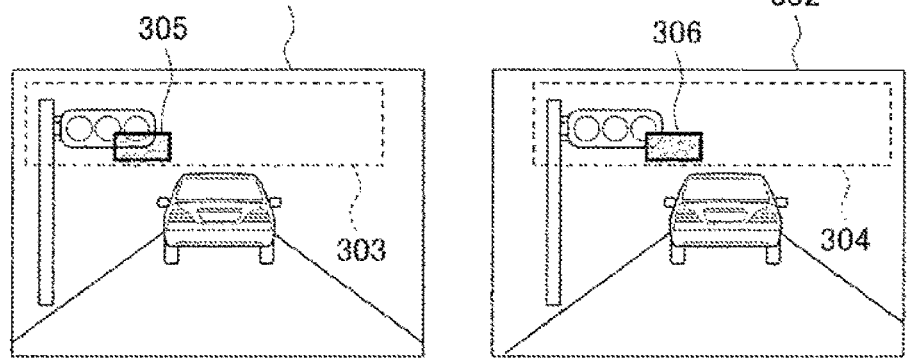
FIG. 3 is a diagram showing a reference image and a comparison image.
FIG. 4 is a table showing filter coefficients of Gaussian filters.
FIG. 5 is a table showing filter coefficients of an unsharp mask filter.

In step S205, processing for equalizing the sharpness in the processing region is carried out. The sharpness equalization means 123 reads the MTF values of each pixel of the reference image and the comparison image from the sharpness information storage means 115, and reads the processing regions of the reference image and the comparison image from the reference image storage means 111 and the comparison image storage means 112, respectively. An MTF minimum value is searched in the processing regions on both the reference image and the comparison image. For each pixel of the reference image and the comparison image, a value obtained by dividing the MTF minimum value by the MTF value of each pixel is set as an MTF variation. Image processing is performed on each pixel by using the adaptive filter corresponding to the MTF variation shown in Table 1. A Gaussian filter, which is an adaptive filter, is a weighted average filter. Elements at the center of the filter have a large weight, and the weight is set to become smaller as a distance from the center of the filter. FIG. 4 is a diagram showing filter coefficients of Gaussian filters with sizes of 3×3 and 5×5, respectively.

TABLE 1

| MTF variation | Adaptive filter |
| --- | --- |
| 0.875 to 1.000 | No filter processing |
| 0.656 to 0.875 | Gaussian filter with a filter coefficient size of 3 × 3 |
| 0.492 to 0.656 | Gaussian filter with a filter coefficient size of 5 × 5 |
| 0.369 to 0.492 | Gaussian filter with a filter coefficient size of 7 × 7 |
| 0.277 to 0.369 | Gaussian filter with a filter coefficient size of 9 × 9 |
| 0.000 to 0.277 | Gaussian filter with a filter coefficient size of 11 × 11 |

For example, when an MTF value of 0.8 is reduced to an MTP minimum value of 0.6, the MTF variation is 75% (=0.6/0.8). At this time, the MTF variation falls within a range from 0.656 to 0.875. Accordingly, the MTF value in the pixel is reduced by the Gaussian filter with a size of 3×3 shown in FIG. 4.

The sharpness equalization means 123 stores the processing regions of the reference image and the comparison image, in which the sharpness is equalized, into the reference image storage means 111 and the comparison image storage means 112, respectively.

In step S206, geometric correction is performed on each of the reference image and the comparison image. The geometric correction means 121 reads, from the geometric correction information storage means 116, the geometric two-dimensional correction amount of each pixel in the images of the imaging element means 103a and the imaging element means 103b, and reads the reference image and the comparison image from the reference image storage means 111 and the comparison image storage means 112, respectively. Further, the position on the reference image in which the two-dimensional correction amount is changed from each pixel in the processing region on the reference image is calculated, and the brightness value at the position is calculated by an interpolation calculation from the brightness value of each pixel in the vicinity of the position. This calculation is performed on all pixels in the processing region on the reference image. Similarly, the position on the comparison image in which the two-dimensional correction amount is changed from each pixel in the processing region on the comparison image is calculated, and the brightness value at the position is calculated by an interpolation calculation from the brightness value of each pixel in the vicinity of the position. This calculation is performed on all pixels in the processing region on the comparison image. The corrected processing regions of the reference image and the comparison image are stored in the reference image storage means 111 and the comparison image storage means 112, respectively.

In step S207, image shrinking processing is performed on the processing regions of the reference image and the comparison image. The image shrinking means 124 reads the processing regions of the reference image and the comparison image from the reference image storage means 111 and the comparison image storage means 112, respectively. A resolution is calculated according to the MTF values in the processing regions that are equalized by the sharpness equalization means 123, and shrinking processing is performed on the processing regions of the reference image and the comparison image so as to have the resolution. As the equalized sharpness in the processing regions decreases, the rate of shrinkage of the processing regions is increased. The processing regions of the processed reference image and the comparison image are stored in the reference image storage means 111 and the comparison image storage means 112, respectively.

In step S208, processing for calculating a parallax is carried out. As shown in FIG. 3, the parallax calculation means 125 extracts an image 305 (template image) of a region with a predetermined size on a processing region 303 of a reference image 301. Further, the image of the region in which the object that is the same as that in the template image 305 is included is searched by template matching as described below on a processing region 304 of a comparison image 302.

In the template matching, an image 306 in a region with a predetermined size on the processing region 304 of the comparison image 302 is extracted, and a sum of absolute difference (SAD) between the brightness value of the template image 305 on the processing region 303 of the reference image 301 and the brightness value of the image 306 in the region with the predetermined size on the processing region 304 of the comparison image 302 is calculated for the image 306 in each region on the processing region 304 of the comparison image 302.

A distance between the regions of the template image 305 and the image 306 in the region on the processing region 304 of the comparison image 302 with a minimum value, that is, a parallax, is calculated. This processing is performed on all the regions on the reference image 301, and the parallax in the entire processing region 303 of the reference image 301 is calculated. The parallax image obtained in this manner is stored in the processing image storage means 113.

In step S209, processing for calculating a distance is carried out. The distance calculation means 126 reads the parallax image from the processing image storage means 113. By the following formula (1), a distance L in the optical axis direction between the imaging device 1 and the image included in the image 305 in each region on the processing region of the reference image is calculated.

$$L = f \times B / (d \times c) \tag{1}$$

where f represents the focal length of the imaging system means 100a and the imaging system means 100b; B represents the distance (baseline length) between the focal point of the imaging system means 100a and the focal point of the imaging system means 100b; d represents a parallax; and c represents a pixel pitch of the imaging element means 103a and the imaging element means 103b.

This calculation processing is performed on the entire region on the processing region of the reference image, and the distance in the optical axis direction between the imaging device 1 and each image in the entire processing region of the reference image is calculated. The distance image obtained in this manner is stored in the processing image storage means 113.

In step S210, object recognition processing is carried out. The recognition means 127 reads the reference image from the reference image storage means 111, and reads the distance image from the processing image storage means 113. Then, the calculation of the position of a vanishing point on the processing region of the reference image, the determination of objects, such as vehicles and pedestrians, the calculation of the relative positions and relative speeds of the objects with respect to the imaging device, and the determination as to a collision between the imaging device and the objects are performed.

First, the recognition means 127 performs the calculation of the position of the vanishing point on the reference image in the following procedure. White lines on both sides of boundaries of lanes on the reference image are detected, and the inclination of each white line on the reference image is calculated. Based on the calculated inclination, assuming that the white lines on the both sides are straight lines, the position of the point on the reference image where the white lines on the both sides intersect with each other is calculated. This position corresponds to the position of the vanishing point.

Next, the recognition means 127 detects objects, such as vehicles and pedestrians, in the following procedure. In the distance image, regions in which pixels having a distance within a predetermined range are connected are obtained. As examples of the predetermined range, a plurality of ranges in which the ranges overlap each other every 2.5 m with a width of 5 m, such as a range from 5 to 10 m, a range from 7.5 to 12.5 m, and a range from 10 to 15 m is set. The longitudinal and lateral lengths on the reference image in each region in which pixels having a distance within the predetermined range are connected are obtained.

The three-dimensional longitudinal length in each region is calculated by dividing a value obtained by multiplying the length, distance, and pixel pitch in the longitudinal direction on the reference image in each region by the focal length. Similarly, the three-dimensional lateral length in each region is calculated by dividing a value obtained by multiplying the length, distance, and pixel pitch in the lateral direction on the reference image in each region by the focal length. A position Vg in the longitudinal direction on the reference image with respect to the ground of each region is approximately calculated by the following formula (2).

$$Vg = Vv - f \times Hi / (Lr \times c) \tag{2}$$

where Vv represents the height of the vanishing point; Hi represents the mounting height of the imaging device; and Lr represents the average distance between regions. This formula is based on an assumption that the optical axis of each of the imaging system means 100a and the imaging system means 100b is substantially horizontal.

When the three-dimensional longitudinal and lateral lengths of the region are within a predetermined range of the vehicle and the difference between the position in the longitudinal direction on the reference image at the lower limit of the region and the position in the longitudinal direction on the reference image of the ground in the region calculated by Formula (2) is within a threshold, the object in the region is determined to be a vehicle. Similarly, when the three-dimensional longitudinal and lateral lengths of the region are within a predetermined range of a pedestrian and the difference between the position in the longitudinal direction on the reference image at the lower limit of the region and the position in the longitudinal direction on the reference image of the ground in the region calculated by Formula (2) is within a threshold, the object in the region is determined to be a pedestrian. These processes are performed on all regions to determine whether the object is a vehicle or a pedestrian.

Next, the calculation of the relative position and relative speed of the object with respect to the imaging device is performed in the following procedure. In the region in which the object is determined to be a vehicle or a pedestrian, the relative position (Xo, Yo, Zo) of the object with respect to the imaging device is calculated by the following formulas (3) to (5). In this case, (Uo, Vo) represents a position on the reference image about the center of the region in which the object is determined to be a vehicle or a pedestrian.

$$Xo = Lr \times c \times Uo / f \tag{3}$$

$$Yo = H + Lr \times c \times (Vo - Vv) / f \tag{4}$$

$$Zo = Lr \tag{5}$$

The processing in steps S201 to S209 is repeatedly performed in a predetermined period. When a difference between the position on the reference image in the region detected in step S206 in the previous processing and that in the present processing is within a threshold, it is determined that the same object is present, and a value obtained by subtracting the relative position calculated in step S206 in the previous processing from the relative position of the object with respect to the imaging device 1 that is calculated in the present processing is divided by the time interval of the processing period in steps S201 to S209, thereby calculating the relative speed (Vx, Vy, Vz) of the object with respect to the imaging device.

Lastly, the determination as to a collision between the object and the imaging device 1 is performed in the following procedure. When the relative speed Vz of the object with respect to the imaging device 1 is equal to or more than 0, it is determined that a collision with the object in the region that is determined to be a vehicle or a pedestrian does not occur. When the relative speed Vz of the object with respect to the imaging device 1 is negative, the relative position Zo of the object with respect to the imaging device 1 that is calculated in the present processing is divided by the absolute value of the relative speed Vz of the object with respect to the imaging device 1, thereby calculating the time that elapses before occurrence of a collision (collision time). Further, the relative position Xo of the object is added to a value obtained by multiplying the collision time by the relative speed Vx of the object with respect to the imaging device 1, thereby calculating the relative position Xo of the object with respect to the imaging device 1 at the time of collision. Accordingly, when the relative speed Vz of the object with respect to the imaging device 1 is negative; the collision time is within the threshold; and the absolute value of the relative position Xo of the object with respect to the imaging device 1 at the time of collision is within the threshold, it is determined that a collision with the object in the region that is determined to be a vehicle or a pedestrian occurs. In the other cases, it is determined that the collision does not occur. The recognition means 127 sends, to the screen/audio output means 130 and the control means 140, the positions at four corners on the reference image related to the region that is determined to be a vehicle or a pedestrian, the relative position and relative speed of the object with respect to the imaging device 1, the collision determination result, and the collision time.

In step S211, screen and audio outputting processing is carried out. The screen/audio output means 130 receives, from the recognition means 127, the positions at four corners on the reference image related to the region that is determined to be a vehicle or a pedestrian, the relative position and relative speed of the object with respect to the imaging device, the collision determination result, and the collision time. Further, the reference image is read from the reference image storage means 111. The reference image is displayed on the screen, and the region determined to be a vehicle or a pedestrian is displayed as a frame. The frame is displayed on the screen in such a manner that the color of the frame indicating the region determined to collide as indicated by the collision determination result is changed from the color of the frame indicating the region of the object determined not to collide as indicated by the determination result. When the region includes the determination result that the collision determination result indicates that a collision occurs, warning sound is output.

In step S212, a control signal is generated and output. The control means 140 receives, from the recognition means 127, the positions at four corners on the reference image related to the region determined to be a vehicle or a pedestrian, the relative position and relative speed of the object with respect to the imaging device 1, the collision determination result, and the collision time. When the region determined to be a vehicle or a pedestrian includes the determination result that the collision determination result indicates that a collision occurs, a control signal for preventing the collision is generated and output to the outside of the imaging device 1.

In the case of a stereo camera using a wide-angle lens, the sharpness at end portions in the upper region and the lower region of each image is much lower than that in the central region. Accordingly, since the sharpness in the central region of each image is different from the sharpness in the right and left regions with respect to the central region even when the resolution is corrected by the related art, as the sharpness of the template image is greatly different from the sharpness of the searched image during image matching in the parallax calculation, the brightness at the location including a brightness change greatly varies, so that the SAD value of the corresponding region increases. Thus, the SAD value may be greater than that in the other regions, which may cause mismatching.

According to the operation procedure (FIG. 2) of an embodiment of the imaging device of the present invention shown in FIG. 1, blur filter processing is performed in step S206 so as to match the processing regions of the reference image and the comparison image, thereby equalizing the sharpnesses in the processing regions of the reference image and the comparison image. As a result, the difference between the brightness values due to the difference between the sharpness of the shrunk template image and the sharpness of the searched image is reduced, thereby making it possible to prevent mismatching.

Further, since mismatching is prevented, the accuracy of object recognition using the distance image is improved in S210. Further, since the accuracy of object recognition is improved, in step S211, the screen/audio output means 130 can display a frame in a predetermined color for the object that is determined to "collide" on the reference image on the screen and can output warning sound at an earlier stage. Accordingly, it is possible to more reliably notify the user of the object to collide. Similarly, since the recognition accuracy is improved, in step S211, when there is an object that is determined to "collide" on the reference image on the screen, the control means can generate a control signal for preventing the collision and can output the control signal to the outside of the imaging device at an earlier stage. Accordingly, the control for more reliably preventing the collision of the object is performed, thereby making it possible to reduce the probability of occurrence of the collision.

For example, according to the operation procedure (FIG. 2) of an embodiment of the imaging device of the present invention shown in FIG. 1, in step S211, the screen/audio output means 130 displays a frame in a predetermined color for the object that is determined to "collide" on the reference image on the screen, thereby making it possible to notify the user of the object to collide.

When the sharpness of each image is reduced, a parallax detection error (variability) increases due to blurring of the image, so that a distance detection error (variability) increases. According to the operation (FIG. 2) of an embodiment of the imaging device of the present invention shown in FIG. 1, in step S207, the processing regions of the reference image and the comparison image are shrunk at a ratio corresponding to the index of sharpness, i.e., the MTF. Accordingly, even if the resolution of the (blurred) image with a low sharpness is reduced, there is little influence of the distance detection error. Meanwhile, the number pixels in the processing region is reduced, thereby reducing the processing load of the parallax calculation in step S208.

The imaging device 1 of the present invention is not limited to the embodiments described above and can be applied to various modifications. Modified examples of the imaging device of the present invention will be described below.

Modified Example 1-1

In the operation procedure (FIG. 2) of an embodiment of the imaging device of the present invention shown in FIG. 1, the sharpnesses in the processing regions of the reference image and the comparison image can be equalized in step S205 by using the PSF or LSF instead of using the MTF as the index of sharpness, thereby making it possible to prevent mismatching due to the difference in sharpness during image matching in step S208.

Modified Example 1-2

In step S205 of the operation procedure (FIG. 2) of an embodiment of the imaging device of the present invention shown in FIG. 1, the sharpnesses in the processing regions of the reference image and the comparison image can be equalized even by performing blur filter processing using a moving average filter or the like, instead of performing the blur filter processing using a Gaussian filter, thereby making it possible to prevent mismatching due to the difference in sharpness during image matching in step S208.

Modified Example 1-3

In step S205 of the operation procedure (FIG. 2) of an embodiment of the imaging device of the present invention shown in FIG. 1, an MTF maximum value is searched in the processing regions of both the reference image and the comparison image, instead of equalizing the sharpnesses in the processing regions of the reference image and the comparison image by setting the MTF in the processing regions to the MTF minimum value in the processing regions of both the reference image and the comparison image. For each pixel in the reference image and the comparison image, a value obtained by dividing the MTF maximum value by the MTF value of each pixel is set as an MTF variation. Image processing is performed on each pixel by using the adaptive filter (sharpening filter) corresponding to the MTF variation shown in Table 2. FIG. 5 shows the filter coefficients of the unsharp mask filter which is an adaptive filter.

TABLE 2

| MTF variation | Adaptive filter |
|---|---|
| 1.00 to 1.15 | Unsharp mask filter with a filter coefficient k = 0.1 |
| 1.15 to 1.45 | Unsharp mask filter with a filter coefficient k = 0.2 |
| 1.45 to 1.75 | Unsharp mask filter with a filter coefficient k = 0.3 |
| 1.75 to 2.05 | Unsharp mask filter with a filter coefficient k = 0.4 |
| 2.05 to 2.35 | Unsharp mask filter with a filter coefficient k = 0.5 |
| 2.35 to 2.65 | Unsharp mask filter with a filter coefficient k = 0.6 |
| 2.65 to 2.95 | Unsharp mask filter with a filter coefficient k = 0.7 |
| 2.95 to 3.25 | Unsharp mask filter with a filter coefficient k = 0.8 |
| 3.25 to 3.55 | Unsharp mask filter with a filter coefficient k = 0.9 |
| 3.55 to 3.85 | Unsharp mask filter with a filter coefficient k = 1.0 |
| 3.85 to | Unsharp mask filter with a filter coefficient k = 0.1 |

For example, when an MTF value of 0.6 is increased to an MTF maximum value of 0.8, the MTF value is increased by 133% (=0.8/0.6). At this time, the MTF variation falls within a range from 1.15 to 1.45, the MTF value in the pixel is increased by the unsharp filter with a coefficient k=0.1.

In step S205, the sharpnesses in the processing regions of the reference image and the comparison image are equalized to a maximum sharpness value, so that the difference between brightness values due to the difference between the sharpness of the temperate image and the sharpness of the searched image is reduced in step S208, thereby making it possible to prevent mismatching. Further, since the sharpnesses are equalized to an MTF maximum value in the processing regions and deterioration in the sharpness in the processing regions of the reference image and the comparison image is not caused, so that the parallax detection error (variability) obtained in step S208 is not increased and the distance detection error (variability) obtained in step S209 does not deteriorate.

Modified Example 1-4

In step S205 of the operation procedure of an embodiment of the imaging device of the present invention shown in Modified Example 1-4, also when the sharpnesses in the processing regions of the reference image and the comparison image are equalized to a maximum sharpness value in step S205 by using, as a sharpening filter, a finite impulse response (FIR) filter, an infinite impulse response (IIR) filter, or the like, the difference between brightness values due to the difference between the sharpness of the template image and the sharpness of the searched image can be reduced in step S208, thereby making it possible to prevent mismatching. Further, since deterioration in the sharpness in the processing regions of the reference image and the comparison image is not caused, the parallax detection error (variability) obtained in step S208 is not increased, thereby preventing deterioration in the distance detection error (variability) obtained in step S209.

Modified Example 1-5

In step S205 of the operation procedure (FIG. 2) of an embodiment of the imaging device of the present invention shown in FIG. 1, for each pixel in the reference image and the comparison image, a value obtained by dividing a predetermined MTF by the MTF value of each pixel is set as an MTF variation, instead of equalizing the sharpnesses in the processing regions of the reference image and the comparison image by setting the MTF in the processing regions to an MTF minimum value in the processing regions of both the reference image and the comparison image. Image processing is performed on each pixel by using the adaptive filters (the blur filter and the sharpening filter) respectively corresponding to the MTF variations shown in Table 1 and Table 2. This enables the equalization of the sharpnesses in the processing regions to a predetermined MTF, so that the difference between brightness values due to the difference between the sharpness of the template image and the sharpness of the searched image in step S208 is reduced, thereby making it possible to prevent mismatching.

Modified Example 1-6

The sharpness information storage means 115 of an embodiment of the imaging device of the present invention shown in FIG. 1 stores the values indicating the index of sharpness at a plurality of predetermined locations in the reference image and the comparison image obtained after the geometric correction. The sharpness information storage means 115 also stores the values indicating the index of sharpness of each pixel in the reference image and the comparison image obtained after the geometric correction calculated by the sharpness calculation means 122. Even when the operation is carried out by replacing the order of step S206 with step S205, the sharpnesses in the processing regions of the reference image and the comparison image can be equalized in step S205, so that the difference between brightness values due to the difference between the sharpness of the template image and the sharpness of the searched image is reduced in step S208, thereby making it possible to prevent mismatching.

Modified Example 1-7

Figure 8:
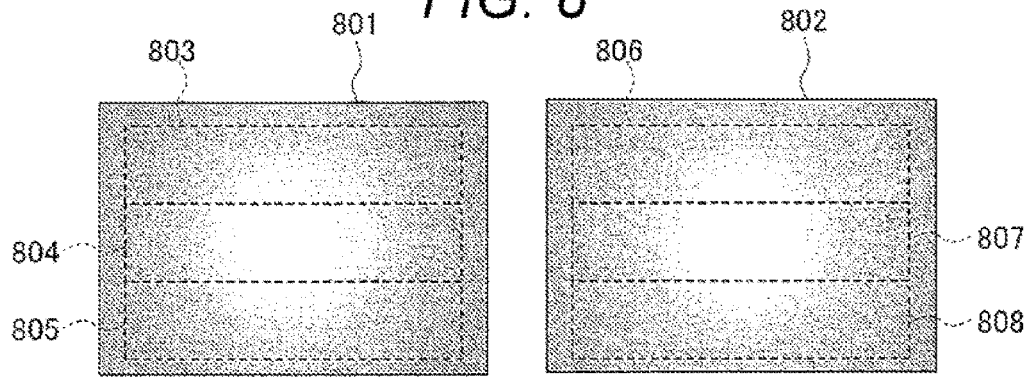
FIG. 8 is a diagram showing an example of processing regions on the reference image and the comparison image.

In step S203 of the operation procedure (FIG. 2) of an embodiment of the imaging device of the present invention shown in FIG. 1, the processing region setting means 119 sets the processing regions by dividing the regions in the longitudinal direction into the processing region in which the MTF minimum value is less than a predetermined MTF and the processing region in which the MTF minimum value is equal to or greater than the predetermined MTF. Steps S204 to S208 are carried out for each processing region. In step S208, one parallax image is created by setting the same number of pixels in the lateral direction of the parallax image in the calculated three processing regions. Specifically, since the image is reduced according to the MTF equalized in step S207, the number of pixels of the parallax image in the three processing regions is different. Accordingly, expansion processing is performed on the other parallax images so that a largest number of pixels are set in the lateral direction in the three parallax images in step S208, thereby connecting the parallax images in the three processing regions. FIG. 8 shows an example in which the MTF values of the reference image and the comparison image are each represented by grayscale and three processing regions are each set in the longitudinal direction. A white area represents a large MTF value, that is, a high sharpness, and a black area represents a small MTF value, that is, a low sharpness. In step S205, the sharpness in the vicinity of the center of each of the reference image and the comparison image is high, and thus the MTF in the central processing region is equalized to be higher than the MTF in the other processing regions. Accordingly, the parallax detection error (variability) in the central processing region calculated in step S208 is smaller than that in the other processing regions, and the distance detection error is also smaller than that in the other processing regions. Unlike in a case where the processing region is not divided, the parallax and distance detection accuracies in the central processing region can be improved.

In a typical lens, a wide-angle lens, and the like, the sharpness in the vicinity of the optical axis is high, and the sharpness tends to decrease as a distance from the optical axis increases. Accordingly, in step S203, the processing region setting means 119 sets a processing region including the optical axis and processing regions other than the processing region, and in step S205, the sharpness equalization means 123 equalizes the sharpnesses in the processing regions to an MTF minimum value of each processing region. As a result, the sharpness in the processing region including the optical axis is higher than the sharpness in the other processing regions, so that the parallax detection accuracy in the processing region including the optical axis is higher than that in the other processing regions. Unlike in a case where the processing regions of the reference image and the comparison image are not divided, the parallax and distance detection accuracies in the central processing region are improved. Further, since the MTF in the processing region in which the optical axis is not included is smaller than that in the processing region including the optical axis, the rate of shrinkage for the shrinking processing in the processing region in which the optical axis is not included is smaller than that in the processing region including the optical axis in step S207. Accordingly, the number of pixels in the processing region in which the optical axis is not included is smaller than that in the processing region including the optical axis, so that the processing load of the parallax calculation in the processing region in which the optical axis is not included is reduced in step S208.

Modified Example 1-8

In step S208 of the operation procedure (FIG. 2) of an embodiment of the imaging device of the present invention shown in FIG. 1, a parallax can be obtained by calculating ZSAD (Zero-mean Sum of Absolute Differences), SSD (Sum of Squared Differences), ZSSD (Zero-mean Sum of Squared Differences), NCC (Normalized Cross Correlation), or ZNCC (Zero-mean Normalized Cross Correlation), searching the region on the comparison image in which the SAD value is minimum, and calculating the parallax, instead of calculating the parallax in such a manner that the parallax calculation means 125 calculates the SAD value and searches the region on the comparison image in which the SAD value is minimum.

Modified Example 1-9

In step S211 of the operation procedure (FIG. 2) of an embodiment of the imaging device of the present invention shown in FIG. 1, even when the screen/audio output means 130 displays a parallax image or a distance image on the screen, instead of displaying the reference image, and displays a frame in a predetermined color for the object that is determined to "collide", it is possible to notify the user of the object to collide.

Modified Example 1-10

Figure 2:
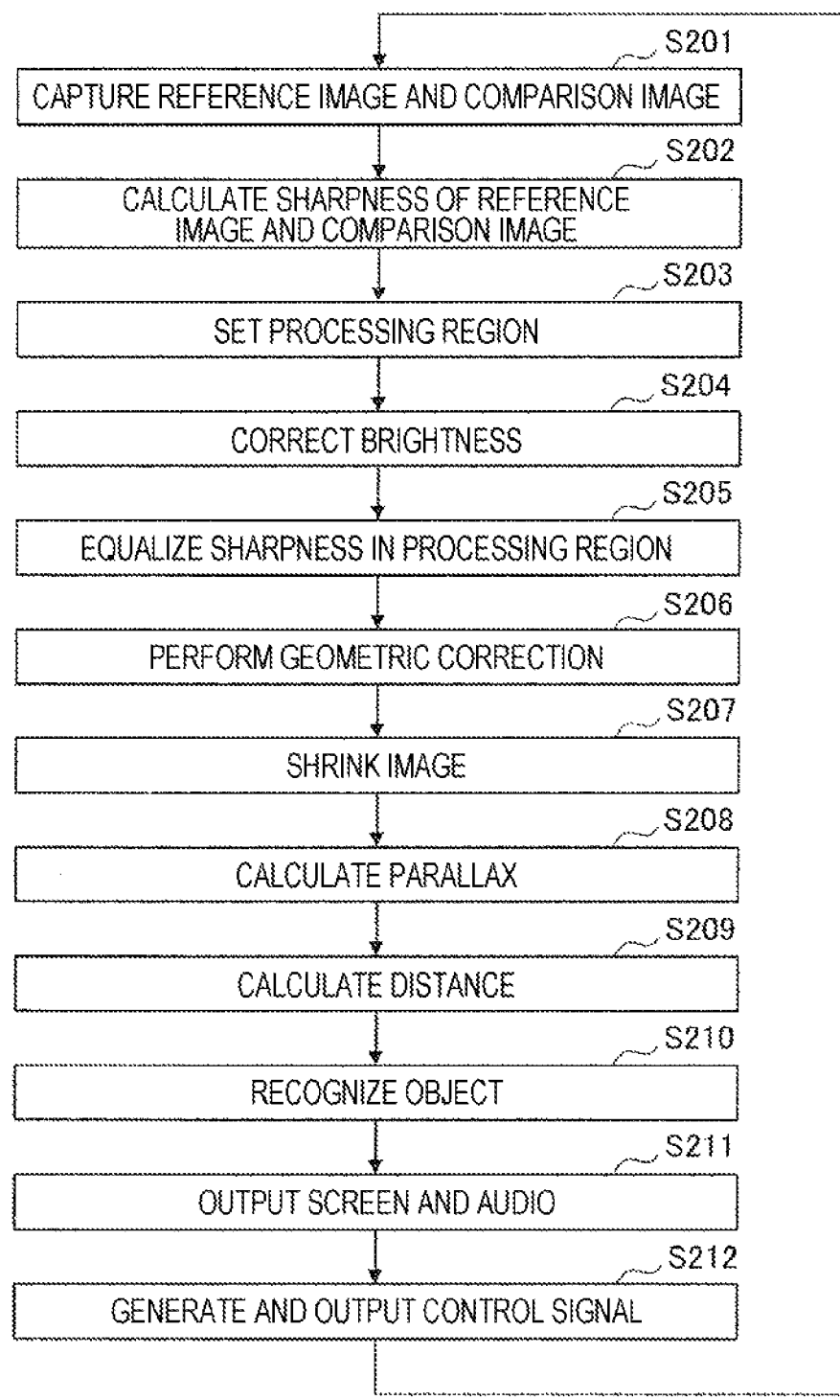
FIG. 2 is a flowchart for explaining an operation of the imaging device.

In an embodiment of the imaging device of the present invention shown in FIG. 1, three or more imaging system means provided, instead of providing two imaging system means, to thereby carry out the operation procedure shown in FIG. 2 for each combination of two imaging system means in a plurality of imaging system means. Thus, objects and a distance to each of the objects photographed by the plurality of imaging system means can be recognized. In each combination of two imaging system means in the plurality of imaging system means, in steps S205 to 207, the sharpnesses in the processing regions of the reference image and the comparison image are equalized to a minimum sharpness value, thereby making it possible to prevent mismatching due to the difference in sharpness during image matching in step S208.

Further, since mismatching is prevented, the accuracy of recognition using the distance image is improved in step S210. Further, since the recognition accuracy is improved, in step S211, the screen/audio output means 130 can display a frame in a predetermined color for the object that is determined to "collide" on the reference image on the screen and can output warning sound at an earlier stage, thereby making it possible to more reliably notify the user of the object to collide.

Similarly, since the recognition accuracy is improved, when there is an object that is determined to "collide" on the reference image on the screen in step S212, the control means can generate a control signal for preventing a collision and can output the control signal to the outside of the imaging device at an earlier stage, thereby making it possible to more reliably perform the control for preventing the collision of the object and reduce the probability of occurrence of the collision.

While the embodiments of the present invention have been described in detail above, the present invention is not limited to the above embodiments and can be designed and modified in various ways without departing from the spirit of the present invention described in the claims. For example, the embodiments have been described in detail above to facilitate understanding of the present invention, and are not necessarily limited to the embodiments including all the components described above. Some of the components in a certain embodiment can be replaced by the components in another embodiment, and components in a certain embodiment can be added to the components of another embodiment. Furthermore, some of the components in each embodiment can be modified by addition, omission, or replacement of other components.

REFERENCE SIGNS LIST 1 imaging device
100a and 100b imaging system means
110 operation means
117 synchronization signal transmission means
118a reference image capture means
118b comparison image capture means
119 processing region setting means
120 brightness correction means
121 geometric correction means
122 sharpness calculation means
123 sharpness equalization means
124 image shrinking means
125 parallax calculation means
126 distance calculation means
127 recognition means
130 screen/audio output means
140 control means

The invention claimed is:

1. An imaging device that calculates a distance to an object based on images obtained by simultaneously photographing the object by a plurality of cameras, the imaging device comprising:
    processing region setting means for setting a processing region on each of the images;
    sharpness equalization means for equalizing sharpness in the processing region of each of the images, the processing region being set by the processing region setting means;
    parallax calculation means for calculating a parallax from the processing region of each of the images, the sharpness in the processing region being equalized by the sharpness equalization means; and
    distance calculation means for calculating a distance to the object based on the parallax calculated by the parallax calculation means.

2. The imaging device according to claim 1, wherein the sharpness equalization means uses a blur filter to reduce the sharpness so that the sharpness in the processing region with a high sharpness is reduced to match the sharpness in the processing region with a low sharpness.

3. The imaging device according to claim 1, wherein the sharpness equalization means uses a sharpening filter to increase the sharpness so that the sharpness in the processing region with a low sharpness is increased to match the sharpness in the processing region with a high sharpness.

4. The imaging device according to claim 1, further comprising image shrinking means for performing shrinking processing on the processing region of which sharpness is equalized by the sharpness equalization means at a ratio corresponding to the equalized sharpness.

5. The imaging device according to claim 1, wherein the processing region setting means sets the plurality of photographed images in a plurality of processing regions, respectively, in a longitudinal direction.

6. The imaging device according to claim 5, wherein
    the processing region setting means sets a processing region including an optical axis and a plurality of processing regions other than the processing region,
    the sharpness equalization means equalizes the sharpness so that the sharpness in the processing region including the optical axis is higher than the sharpness in the processing regions other than the processing region.

* * * * *